United States Patent [19]

Blomgren et al.

[11] 4,444,855

[45] Apr. 24, 1984

[54] NON-AQUEOUS ELECTROCHEMICAL CELL

[75] Inventors: George E. Blomgren, Lakewood; Marvin L. Kronenberg, Cleveland Heights, both of Ohio

[73] Assignee: Union Carbide Corporation, Danbury, Conn.

[21] Appl. No.: 474,267

[22] Filed: May 29, 1974

[51] Int. Cl.³ .............................................. H01M 6/14
[52] U.S. Cl. .................... 429/105; 429/196; 429/197; 429/199
[58] Field of Search .................... 136/6 LN, 6 F, 6 R, 136/20, 83 R, 100 R, 154–155, 137, 121; 429/101, 105, 196, 197, 199, 194, 218

[56] References Cited

U.S. PATENT DOCUMENTS

| | | | |
|---|---|---|---|
| 3,248,265 | 4/1966 | Herbert | 429/199 X |
| 3,415,687 | 12/1968 | Methlie | 429/199 X |
| 3,475,226 | 10/1969 | Fraioli | 429/72 |
| 3,508,966 | 4/1970 | Eisenberg | 429/199 X |
| 3,542,602 | 11/1970 | Gabano | 429/194 |
| 3,547,703 | 12/1970 | Blomgren et al. | 429/194 |
| 3,567,515 | 3/1971 | Maricle et al. | 429/105 |
| 3,578,500 | 5/1971 | Maricle et al. | 429/105 |

FOREIGN PATENT DOCUMENTS 48-31298 9/1973 Japan .................................. 136/137

OTHER PUBLICATIONS

Batelle Memorial Institute Report on Lithium Battery Development (AFAPL-TR-71-49), Jun. 1971, pp. 5–10.

Primary Examiner—Anthony Skapars
Attorney, Agent, or Firm—Cornelius F. O'Brien

[57] ABSTRACT

The invention relates to the use in a non-aqueous electrochemical cell of a conductive electrolyte comprising an ionizing solute dissolved in a mixture of a selected halide of an element of Group IV to Group VI of the Periodic Table and a cosolvent. The selected halide serves the dual function of acting as a solvent for the solute and as the active cathode depolarizer of the cell.

16 Claims, 1 Drawing Figure

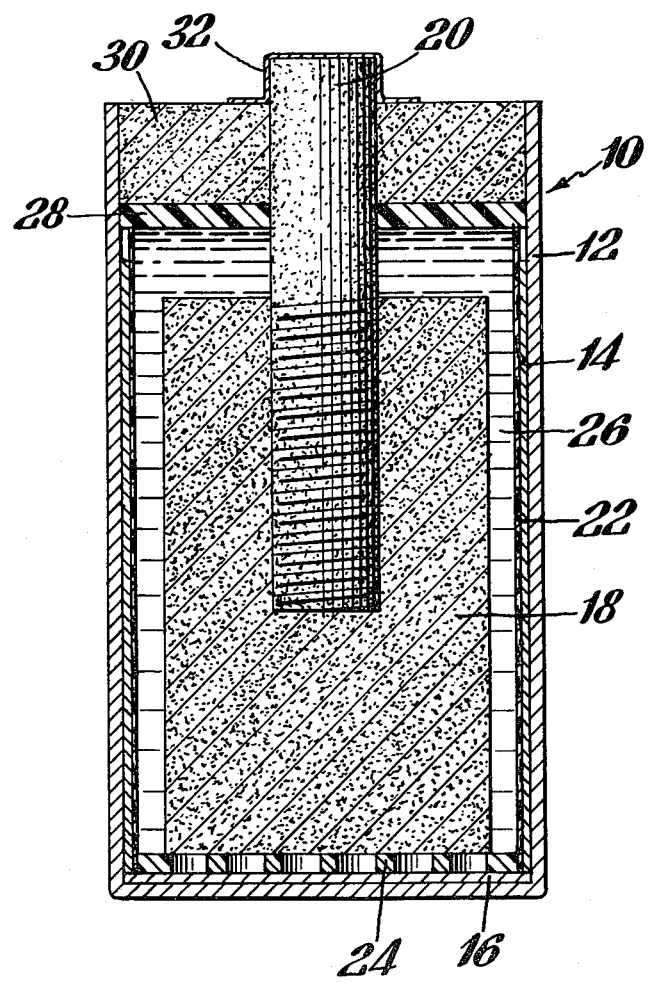

NON-AQUEOUS ELECTROCHEMICAL CELL

This invention relates to electrochemical systems and more particularly relates to the use in primary and secondary non-aqueous electrochemical cells of selected inorganic liquid halides which are capable of performing the dual function of being the active cathode depolarizer material for the cell and acting as a solvent for the electrolyte salt (solute).

The development of high energy battery systems requires, among other things, the compatibility of an electrolyte possessing desirable electrochemical properties with highly reactive anode materials, such as sodium and lithium. The use of aqueous electrolytes is precluded in these systems since the anode materials are sufficiently active to react with water chemically. It has, therefore, been necessary, in order to realize the high energy density obtainable through use of these highly reactive anodes, to turn to the investigation of non-aqueous electrolyte systems.

The term "non-aqueous electrolyte" as used herein refers to an electrolyte which is composed of a solute such as, for example, a metal salt or a complex salt of Group I-A, Group II-A or Group III-A elements of the Periodic Table, dissolved in an appropriate non-aqueous solvent. The term "Periodic Table" as used herein refers to the Periodic Table of Elements as set forth on the inside back cover of the Handbook of Chemistry and Physics, 48th Edition, The Chemical Rubber Co., Cleveland, Ohio, 1967–1968.

A multitude of solutes is known and many have been suggested for use but the selection of a suitable solvent has been particularly troublesome. The ideal battery electrolyte would comprise a solvent-solute pair which has a long liquid range, high ionic conductivity and stability. A long liquid range, i.e., high boiling point and low freezing point, is essential if the battery is to operate at other than normal ambient temperatures. High ionic conductivity is necessary if the battery is to have high rate capability. Stability is necessary with the electrode materials, the materials of cell construction and the products of the cell reaction to provide long shelf life when used in a primary or secondary battery system.

It has recently been disclosed in the literature that certain materials are capable of acting both as an electrolyte carrier, i.e., as solvent for the electrolyte salt, and as the active cathode for a non-aqueous electrochemical cell. U.S. Pat. Nos. 3,475,226; 3,567,515; and 3,578,500 each disclose that liquid sulfur dioxide or solutions of sulfur dioxide and a cosolvent will perform this dual function in non-aqueous electrochemical cells. While these solutions perform their dual function, they are not without several disadvantages in use. Sulfur dioxide is always present and being a gas at ordinary temperatures and pressures, it must be contained in the cell as a liquid under pressure or dissolved in a liquid solvent. Handling and packaging problems are created if the sulfur dioxide is used alone and an additional component and assembly step are necessary if sulfur dioxide is to be dissolved in a liquid solvent. As stated above, a long liquid range encompassing normal ambient temperatures is a desirable characteristic in an electrolyte solvent. Obviously, sulfur dioxide is deficient in this respect at atmospheric pressure.

In our application Ser. No. 439,521 filed Feb. 2, 1974 which is a continuation-in-part of our application Ser. No. 212,582 filed on Dec. 27, 1971, now abandoned, a non-aqueous electrochemical cell is disclosed which uses an oxyhalide of an element of Group V or Group VI of the Periodic Table as both a solvent for the electrolyte salt and as the active cathode depolarizer of the cell system.

In a Battelle Laboratories Report dated June 1971, under an Air Force Aero Propulsion Laboratory Contract TR-71-49, a disclosure is made to the use of specific liquid halide materials as positive electrodes in lithium batteries. The selection of the specific liquid halide materials recited in the publication was made so as to disclose the best halides which would be theoretically suited as active cathode materials for lithium battery applications as based on their characteristics such as melting point, stability and reactivity with organic solvents of the type used in lithium batteries.

The present invention is based on the discovery that certain halides not disclosed in the prior art as suitable for non-aqueous cell systems and which are liquids at ordinary temperatures can perform the dual function of acting as an electrolyte carrier and cathode depolarizer in non-aqueous electrochemical cells and can be selected so as to be stable in the presence of the other cell components.

As used herein and as disclosed in an article titled "Electrochemical Reactions in Batteries" by Akiya Kozawa and R. A. Powers in the Journal of Chemical Education—Vol. 49, pages 587 to 591, September 1972 issue, a cathode depolarizer is the active cathode reactant and, therefore, is the material electrochemically reduced at the cathode. The cathode collector is not an active reducible material and functions as a current collector plus electronic conductor to the cathode terminal of a cell. In other words, the cathode collector when used in conjunction with a liquid active depolarizer, is a situs for the electrochemical reduction reaction of the active cathode material and the electronic conductor to the cathode terminal of a cell.

A liquid active reducible cathode material (depolarizer) can either be employed by itself in an electrochemical device (i.e., galvanic cell), mixed with a ionizing solute which is a non-reactive material but is added to improve conductivity of the liquid active reducible cathode materials, or mixed with both an ionizing solute and a non-reactive cosolvent material. A non-reactive cosolvent material is one that is electrochemically inactive and, therefore, cannot function as the active cathode material (depolarizer).

In accordance with the present invention, there is provided a non-aqueous electrochemical system comprising an anode, a cathode collector and a cathode-electrolyte consisting of an ionizing solute dissolved in a liquid halide solvent and a cosolvent, said liquid halide being selected from the group consisting of sulfur monochloride ($S_2Cl_2$), sulfur monobromide ($S_2Br_2$), selenium tetrafluoride ($SeF_4$), selenium monobromide ($Se_2Br_2$), thiophosphoryl chloride ($PSCl_3$), thiophosphoryl bromide ($PSBr_3$), vanadium pentafluoride ($VF_5$), lead tetrachloride ($PbCl_4$), titanium tetrachloride ($TiCl_4$), disulfur decafluoride ($S_2F_{10}$), tin bromide trichloride ($SnBrCl_3$), tin dibromide dichloride ($SnBr_2Cl_2$) and tin tribromide chloride ($SnBr_3Cl$). Of the above-mentioned halides, sulfur monochloride, sulfur monobromide, selenium tetrafluoride, selenium monobromide, thiophosphoryl chloride, thiophosphoryl bromide, vanadium pentafluoride and lead tetrachloride are the preferable halide electrolytes of this invention with sulfur monochloride, sulfur monobromide and selenium tetrafluoride being the most preferable halide electrolytes. The halide electrolyte solvent of this invention will perform the dual function of acting as a solvent for the ionizing solute and as the active cathode depolarizer of the cell. The term "cathode-electrolyte" is used herein to describe electrolyte solutions containing materials which perform this dual function.

The use of a single component of the cell as both an electrolyte carrier and an active cathode depolarizer is a relatively recent development since previously it was generally considered that the two functions were necessarily independent and could not be served by the same material. For an electrolyte carrier to function in a cell, it is necessary that it, in conjunction with the ionizing solute, contact both the anode and the cathode depolarizer, forming a continuous ionic path, and it has generally been assumed that the active cathode material must never directly contact the anode if the cell is intended to be stored for a period of time prior to use. It would, therefore, appear that the two functions are mutually exclusive. However, it has recently been discovered that certain active cathode materials such as sulfur dioxide do not react chemically to any appreciable extent with an active anode metal at the interface between the metal and the cathode material, thereby allowing the cathode material to contact the anode directly while acting as the electrolyte carrier. While the theory behind the cause of the inhibition of direct chemical reaction is not fully understood at the present time, and applicants do not desire to be limited to any theory of invention, it appears that continued direct chemical reaction is inhibited either by an inherently high activation energy of reaction or the formation of a thin, protective film on the anode surface. Any protective film on the anode surface must not be formed to such an extent that an unacceptably large increase in anode polarization results on discharge.

The active reducible cathode materials of the present invention are believed to inhibit the direct reaction of active anode metal surfaces sufficiently to permit the active reducible cathode materials to act as an electrolyte carrier but not to an extent such that the performance of the cell is substantially impaired. In this respect, the active reducible cathode materials of the present invention may act much in the same manner as sulfur dioxide but, being liquids, are not subject to its disadvantages in use.

The FIGURE shows a cross-sectional view of a possible embodiment of the present invention.

Referring in detail to the FIGURE there is shown a round cell formed and sealed in a metal can and comprising a lithium anode and a cathode-electrolyte of an ionizing solute dissolved in a mixture of a selected liquid halide and a cosolvent.

The round cell, generally designated 10, is shown as a cylindrical metal can 12, such as a magnesium can, which is lined with a lithium anode comprising a side wall anode member 14 of a sheet of lithium metal completely encircling the inner circumference of the can 12 and a bottom anode member 16 of a disc of lithium metal at the base of the can 12.

A cathode collector is shown in the center of the can 12 and comprises a cylinder of porous graphite 18 having a graphite rod 20 extending upwardly therefrom. The cathode collector is shown physically separated from the anode by a two component separator comprising a side wall separator member 22 of a sheet of compacted polypropylene fibers and a bottom separator member 24 of a polytetrafluoroethylene disc having perforations therethrough.

The porous graphite cylinder and the space between the cathode collector and the anode contain an ionically conductive solution 26 of an ionizing solute in a selected halide and cosolvent mixture, said selected halide acting as both the active cathode and as an electrolyte carrier for the cell.

The cell closure consists of a tightly fitting polytetrafluoroethylene disc 28, having a central hole for snugly engaging the graphite rod 20, and a layer of epoxy resin 30 above the polytetrafluoroethylene disc 28 to insure a liquid and gas tight seal. A metal cap 32 is shown crimped over the end of the graphite rod 20 so as to provide external cathode contact to complete the cell.

Basically, the components of the cell of the present invention are an anode, a cathode collector and a cathode-electrolyte consisting of a solute dissolved in a mixture of a selected halide and a cosolvent.

Since the liquid halides of this invention may not sufficiently dissolve an ionizing solute to a degree necessary to provide an acceptably ionically conductive solution for non-aqueous cell applications; it will be necessary to add at least one cosolvent in an amount sufficient to obtain a solution having an ionic conductance of at least $10^{-4}$ ohm$^{-1}$ cm$^{-1}$, said solution being the cathode-electrolyte according to this invention.

Useful organic cosolvents for use in this invention include the following classes of compounds:

Trialkyl borates: e.g., trimethyl borate, $(CH_3O)_3B$
(liquid range $-29.3°$ to $67°$ C.)

Tetraalkyl silicates: e.g., tetramethyl silicate, $(CH_3O)_4Si$ (boiling point $121°$ C.)

Nitroalkanes: e.g., nitromethane, $CH_3NO_2$
(liquid range $-17°$ to $100.8°$ C.)

Alkylnitriles: e.g., acetonitrile, $CH_3CN$
(liquid range $-45°$ to $81.6°$ C.)

Dialkylamides: e.g., dimethylformamide, $HCON(CH_3)_2$
(liquid range $-60.48°$ to $149°$ C.)

Lactams: e.g., N-methylpyrrolidone,

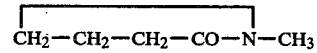

(liquid range $-16°$ to $202°$ C.)

Tetraalkylureas: e.g., tetramethylurea, $(CH_3)_2N-CO-N(CH_3)_2$
(liquid range $-1.2°$ to $166°$ C.)

Monocarboxylic acid esters: e.g., ethyl acetate
(liquid range $-83.6°$ to $77.06°$ C.)

Orthoesters: e.g., trimethylorthoformate, $HC(OCH_3)_3$
(boiling point $103°$ C.)

Lactones: e.g., γ-(gamma)butyrolactone,

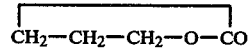

(liquid range $-42°$ to $206°$ C.)

Dialkyl carbonates: e.g., dimethyl carbonate, $OC(OCH_3)_2$
(liquid range $2°$ to $90°$ C.)

Alkylene carbonates: e.g., propylene carbonate,

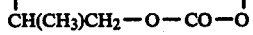

(liquid range −48° to 242° C.)
Monoethers: e.g., diethyl ether
(liquid range −116° to 34.5° C.)
Polyethers: e.g., 1,1- and 1,2-dimethoxyethane
(liquid ranges −113.2° to 64.5° C. and −58° to 83° C., respectively)
Cyclic ethers: e.g., tetrahydrofuran
(liquid range −65° to 67° C.);
1,3-dioxolane
(liquid range −95° to 78° C.)
Nitroaromatics: e.g., nitrobenzene
(liquid range 5.7° to 210.8° C.)
Aromatic carboxylic acid halides: e.g., benzoyl chloride
(liquid range 0° to 197° C.);
benzoyl bromide
(liquid range −24° to 218° C.)
Aromatic sulfonic acid halides: e.g., benzene sulfonyl chloride
(liquid range 14.5° to 251° C.)
Aromatic phosphonic acid dihalides: e.g., benzene phosphonyl dichloride
(boiling point 258° C.)
Aromatic thiophosphonic acid dihalides: e.g., benzene thiophosphonyl dichloride
(boiling point 124° C., at 5 mm.)
Cyclic sulfones: e.g., sulfolane,

(melting point 22° C.);
3-methylsulfolane
(melting point −1° C.)
Alkyl sulfonic acid halides: e.g., methanesulfonyl chloride
(boiling point 161° C.)
Alkyl carboxylic acid halides: e.g., acetyl chloride
(liquid range −112° to 50.9° C.);
acetyl bromide
(liquid range −96° to 76° C.);
propionyl chloride
(liquid range −94° to 80° C.)
Saturated heterocyclics: e.g., tetrahydrothiophene
(liquid range −96° to 121° C.);
3-methyl-2-oxazolidone
(melting point 15.9° C.)
Dialkyl sulfamic acid halides: e.g., dimethyl sulfamoyl chloride
(boiling point 80° C., 16 mm.)
Alkyl halosulfonates: e.g., ethyl chlorosulfonate
(boiling point 151° C.)
Unsaturated heterocyclic carboxylic acid halides: e.g., 2-furoyl chloride
(liquid range −2° to 173° C.)
Five-membered unsaturated heterocyclics: e.g., 3,5-dimethylisoxazole
(boiling point 140° C.);
1-methylpyrrole
(boiling point 114° C.);
2,4-dimethylthiazole
(boiling point 144° C.);
furan
(liquid range −85.65° to 31.36° C.)
Esters and/or halides of dibasic carboxylic acids: e.g., ethyl oxalyl chloride
(boiling point 135° C.)
Mixed alkyl sulfonic acid halides and carboxylic acid halides: e.g., chlorosulfonyl acetyl chloride
(boiling point 98° C. at 10 mm.)
Dialkyl sulfoxides: e.g., dimethyl sulfoxide
(liquid range 18.4° to 189° C.)
Dialkyl sulfates: e.g., dimethylsulfate
(liquid range −31.75° to 188.5° C.)
Dialkyl sulfites: e.g., dimethylsulfite
(boiling point 126° C.)
Alkylene sulfites: e.g., ethylene glycol sulfite
(liquid range −11° to 173° C.)
Halogenated alkanes: e.g., methylene chloride
(liquid range −95° to 40° C.);
1,3-dichloropropane
(liquid range −99.5° to 120.4° C.)

Of the above, the preferred cosolvents are nitrobenzene; tetrahydrofuran; 1,3-dioxolane; 3-methyl-2-oxazolidone; propylene carbonate; γ-butyrolactone; sulfolane; ethylene glycol sulfite; dimethylsulfite; dimethyl sulfoxide; and benzoyl chloride. Of the preferred cosolvents, the best are nitrobenzene; 3-methyl-2-oxazolidone; benzoyl chloride; dimethyl sulfite and ethylene glycol sulfite because they are more chemically inert to battery components and have long liquid ranges, and especially because they permit highly efficient utilization of the cathode materials.

It is also within this invention to employ inorganic cosolvents such as inorganic oxyhalides, e.g., phosphorus oxychloride, sulfuryl chloride, thionyl chloride, pyrosulfuryl chloride and selenium oxychloride, which, in addition to functioning as an electrolyte carrier in non-aqueous cells, will also function as an active reducible cathode thereby contributing to the overall active reducible material in such cells.

Useful anode materials are generally consumable metals and include aluminum, the alkali metals, alkaline earth metals and alloys of alkali metals or alkaline earth metals with each other and other metals. The term "alloy" as used herein and in the appended claims is intended to include mixtures, solid solutions such as lithium-magnesium, and intermetallic compounds such as lithium monoaluminide. The preferred anode materials are the alkali metals and particularly lithium, sodium and potassium.

Any compatible solid, which is substantially electronically conductive and inert in the cell, will be useful as a cathode collector in the cells of the present invention since the main function of the collector is to permit external electrical contact to be made with the active cathode material.

It is desirable to have as much surface contact as possible between the cathode and the collector. It is, therefore, preferred to employ a porous collector since it will provide a high surface area interface with the liquid active cathode material. The collector may be metallic and may be present in any physical construction such as a metallic film, screen or a pressed powder. Preferably, however, a pressed powder collector will be at least partially of carbonaceous or other conductive high surface area material.

The ionizing solute for use in invention may be a simple or double salt or mixtures thereof, which will produce an ionically conductive solution when dissolved in one or more solvents. Preferred solutes are complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226—July/December 1938, pages 293-313 by Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the double salt or the resulting ions in situ. One such double salt, for example, is that formed by the combination of aluminum chloride and lithium chloride to yield lithium aluminum tetrachloride.

In selecting the particular halide for a particular cell in accordance with this invention, one should also consider the stability of the particular halide in the presence of the other cell components and operating temperatures at which the cell is expected to perform. Thus a halide should be selected that will be stable in the presence of the other cell components.

In addition, if it is desired to render the electrolyte solution more viscous or convert it into a gel, a gelling agent such as colloidal silica may be added.

The following examples are illustrative of the present invention and are not intended in any manner to be limitative thereof.

EXAMPLE 1

Each of nine test cells was assembled in which the cathode-electrolyte solution was placed in a glass container. A piece of lithium sheet serving as the anode and a small porous graphite block serving as the cathode collector were suspended in the electrolyte with provision for external electrical contact to these electrodes after the cell was sealed. The electrodes were spaced about 2 centimeters apart and each had a total surface area of 11 square centimeters of which about 6–8 square centimeters was immersed in the electrolyte. Each of the cells utilized a lithium anode and a cathode-electrolyte system as shown in Table I. On a 10-milliampere per square centimeter drain to a 1.0 volt cutoff, the discharge capacity and the average discharge voltage along with the cell resistance were obtained for each cell and are shown in Table I. As demonstrated by the data in Table I, cells made according to this invention had a capacity of from 130 mAh to 940 mAh, thus showing that the performance of the cells can be optimized by selecting the proper combination of solute, halide and cosolvent.

EXAMPLE 2

A flat-type cell was constructed utilizing a metal base having a shallow depression in which the cell contents were placed and a metal cap for sealing the cell. The contents consisted of a 5 square centimeter lithium anode disc, 5 milliliters of a 1 molar solution of $LiAlCl_4$ in a mixture of 25 v/o (volume percent) $S_2Cl_2$—75 v/o nitrobenzene, a 0.05 inch thick porous cathode collector made of compressed conductive carbon and a polypropylene separator. The total thickness of the anode, cathode collector and separator was about 0.2 centimeter. On a 1 milliampere drain to a 1.0 volt cutoff, this cell had a discharge capacity of 414 mAh and discharged continuously at an average voltage of 3.38 volts for 414 hours.

TABLE I

| Test Cell | Compound (volume percent = v/o) | Electrolyte Salt and Cosolvent | Capacity on 10-mA Drain (mAh) | Average Discharge Voltage | Cell Resistance (ohms) |
|---|---|---|---|---|---|
| 1 | 10v/o $S_2Cl_2$ | 1M $LiAlCl_4$ benzoyl chloride | 740 | 2.5 | 9.7 |
| 2 | $S_2Br_2$ | $(C_4H_7)_4NBr$ No cosolvent | 195 | 3.4 | 140.0 |
| 3 | 10v/o $S_2Br_2$ | 1 M LiBr + 1M $AlBr_3$ nitrobenzene | 445 | 2.9 | 9.5 |
| 4 | 5v/o $S_2Cl_2$ | 1M $LiAlCl_4$ nitrobenzene | 410 | 2.7 | 10.0 |
| 5 | 10v/o $S_2Cl_2$ | 1M $LiClO_4$ tetrahydrofuran | 320 | 2.9 | 21.0 |
| 6 | 50v/o $S_2Cl_2$ | 1M $LiAlCl_4$ nitrobenzene | 940 | 2.8 | 13.8 |
| 7 | 10v/o $S_2Cl_2$ | 1M $LiClO_4$ propylene carbonate | 470 | 2.6 | 19.3 |
| 8 | 10v/o $TiCl_4$ | 1M $LiAlCl_4$ nitrobenzene | 200 | 2.6 | 10.8 |
| 9 | 10v/o $PSBr_3$ | 1M $LiAlCl_4$ nitrobenzene | 130 | 2.2 | 14.0 |

What is claimed is:

1. A non-aqueous electrochemical cell comprising an anode, an inert cathode collector and a cathode-electrolyte, said cathode-electrolyte comprising an ionically conductive solution of a solute dissolved in a liquid halide solvent, said halide being at least one active cathode depolarizer selected from the group consisting of sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride.

2. The non-aqueous electrochemical cell of claim 1 wherein said halide is selected from the group consisting of sulfur monochloride, sulfurmonobromide, selenium tetrafluoride, selenium monobromide, thiophosphoryl chloride, thiophosphoryl bromide, vanadium pentafluoride and lead tetrachloride.

3. The non-aqueous electrochemical cell of claim 2 wherein said halide is selected from the group consisting of sulfur monochloride, sulfur monobromide and selenium tetrafluoride.

4. The non-aqueous electrochemical cell of claim 1 wherein said anode is selected from the group consisting of aluminum, alkali metals, alkaline earth metals, alloys of alkali metals, alloys of alkaline earth metals and mixtures thereof.

5. The non-aqueous electrochemical cell of claim 1 wherein said cathode collector is a porous carbonaceous material.

6. The non-aqueous electrochemical cell of claim 1 wherein said solute is a complex salt of a Lewis acid and an inorganic ionizable salt.

7. The non-aqueous electrochemical cell of claim 6 wherein said complex salt is lithium aluminum tetrachloride.

8. The non-aqueous electrochemical cell of claim 1 wherein the cathode-electrolyte contains at least one cosolvent selected from the group consisting of nitrobenzene, tetrahydrofuran, 1,3-dioxolane, 3-methyl-2-oxazolidone, propylene carbonate, $\gamma$-butyrolactone, sulfolane, ethylene glycol sulfite, dimethylsulfite, dimethyl sulfoxide and benzoyl chloride.

9. The non-aqueous electrochemical cell of claim 8 wherein at least one of said cosolvents is selected from the group consisting of nitrobenzene, 3-methyl-2-oxazolidone, benzoyl chloride, dimethylsulfite and ethylene glycol sulfite.

10. The non-aqueous electrochemical cell of claim 1 wherein said cathode-electrolyte contains an inorganic cosolvent selected from the group consisting of phosphorus oxychloride, sulfuryl chloride, thionyl chloride, pyrosulfuryl chloride and selenium oxychloride.

11. The non-aqueous electrochemical cell of claim 1 wherein said anode is lithium metal and said cathode-electrolyte is a solution of lithium aluminum tetrachloride in sulfur monochloride and nitrobenzene.

12. The non-aqueous electrochemical cell of claim 1 wherein said anode is lithium metal and said cathode-electrolyte is a solution of lithium aluminum tetrachloride in sulfur monochloride and dimethylsulfite.

13. The non-aqueous electrochemical cell of claim 1 wherein said anode is lithium metal and said cathode-electrolyte is a solution of lithium aluminum tetrachloride in sulfur monochloride and benzoyl chloride.

14. The non-aqueous electrochemical cell of claim 1 wherein said anode is lithium metal and said cathode-electrolyte is a solution of lithium aluminum tetrachloride in sulfur monochloride and phosphorus oxychloride.

15. The non-aqueous electrochemical cell of claim 1 wherein said anode is lithium metal and said cathode-electrolyte is a solution of lithium aluminum tetrachloride in sulfur monochloride and ethylene glycol sulfite.

16. A non-aqueous electrochemical cell comprising an anode, a cathode collector and an ionically conductive electrolyte solution containing an active cathode depolarizer wherein said active cathode depolarizer consists of a liquid halide selected from the group consisting of sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride.

* * * * *